United States Patent [19]

Costes et al.

[11] Patent Number: 5,117,494
[45] Date of Patent: May 26, 1992

[54] SYSTEM FOR SELECTIVELY DETECTING AND BYPASSING INOPERATIVE MODULE WITHIN A DAISY CHAINED PROCESSING SYSTEM

[75] Inventors: Michel Costes, Cagnes sur Mer; Alain R. Gach; Jean-Pierre C. Dugre, both of Vence, France

[73] Assignee: International Business Machines Corporation, Armonk, N.Y.

[21] Appl. No.: 114,804

[22] Filed: Oct. 29, 1987

[30] Foreign Application Priority Data

Oct. 30, 1986 [EP] European Pat. Off. ......... 86430045

[51] Int. Cl.⁵ ................. G06Z 11/16; G06Z 13/37
[52] U.S. Cl. .................. 395/575; 364/DIG. 1; 364/229.3; 364/266.6; 364/268.9; 364/269.2; 371/11.2; 340/825.05
[58] Field of Search ... 364/200 MS File, 900 MS File; 371/11.11.2; 340/825.50, 825.05

[56] References Cited

U.S. PATENT DOCUMENTS

| 4,271,511 | 6/1981 | Manber et al. | 371/8 |
|---|---|---|---|
| 4,380,052 | 4/1983 | Shima | 364/900 |
| 4,408,300 | 10/1983 | Shima | 364/900 |
| 4,415,973 | 11/1983 | Evans | 364/200 |
| 4,527,270 | 7/1985 | Sweeton | 371/11 |
| 4,573,120 | 2/1986 | Ichimiya et al. | 364/200 |
| 4,611,297 | 9/1986 | Dudley et al. | 364/900 |
| 4,620,278 | 10/1986 | Ellsworth et al. | 364/200 |
| 4,698,772 | 10/1987 | Carter et al. | 364/900 |
| 4,713,811 | 12/1987 | Frey | 371/11 X |

FOREIGN PATENT DOCUMENTS 2110847 6/1983 United Kingdom .

Primary Examiner—Thomas C. Lee
Attorney, Agent, or Firm—Joscelyn G. Cockburn

[57] ABSTRACT

An adapter No $(n-1)$ propagates a daisy-chained grant signal directly to the adapter No $(n)$ and a by-passed grant signal to the adapter No $(n+1)$ case. The adapter No $(n)$ is responsive to the status of the previous adapter in the chain, for determining which of the regular grant signal ("GR") or by-passed grant signal ("GRA") has to be taken account of by the succeeding adapter, when the latter wants to access the transmission bus (11). Further, the adapters connected to the chain may be partitioned into groups (80) within which the grant signal is distributed in parallel to the adapters, and propagated to the next group only when none of its adapters (10) requests access to the transmission bus. The same priority level is given to each adapter or group of adapters connected to the daisy-chain, and permits said chain to remain operative even when several adapters are unplugged or malfunction.

8 Claims, 6 Drawing Sheets

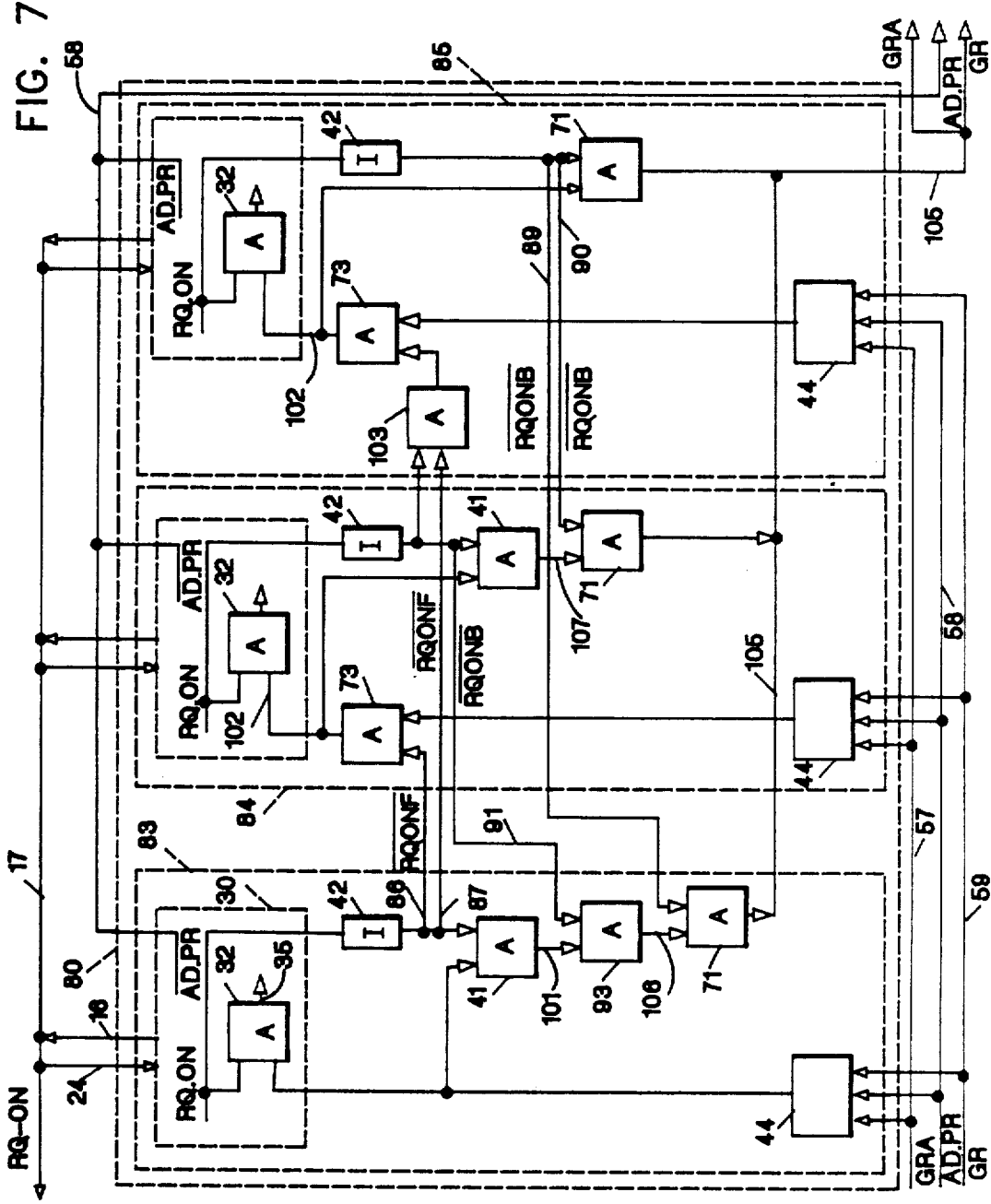

SYSTEM FOR SELECTIVELY DETECTING AND BYPASSING INOPERATIVE MODULE WITHIN A DAISY CHAINED PROCESSING SYSTEM

FIELD OF THE INVENTION

This invention relates to a circuit which improves the conventional priority scheme of a daisy-chain configuration, as well as its continuity of operation when one or several processing units are unplugged or malfunctioning.

BACKGROUND ART

When several processing units are connected to a time-shared bus of a data-processing network, two main issues or problems have to be considered: the problem of the priority scheme according to which access to the bus is granted to connected devices, and the problem of the continuity of the transmission on the bus when one or several devices are unplugged or malfunctioning.

Such problems appear currently in the field of communication controllers, where a plurality of line-adapters have a time-shared access to a Central Control Unit (CCU) by means of a bus including one or several control lines. Therefore, for the sake of simplicity in the following descriptions, the devices connected in a daisy-chain configuration will be assumed to be the line-adapters of a communication controller, hereafter called "adapters", without prejudice to the generality of the invention. In fact, a similar reasoning would apply to a variety of other devices: processors, memories and the like.

When the adapters connected to a time-shared bus are controlled by a control line which is conventionally daisy-chained, their operation has two main drawbacks:

1. Since the control signal which grants access to the bus is propagated from one adapter to the succeeding one down the bus, the adapters closer to the bus origin have a higher priority level than the ones located farther.

2. When an adapter receives the grant signal and does not request access to the bus for transmission, it has to transmit said grant signal to the succeeding adapter, which may have requested access to the bus. Consequently, when an adapter is unplugged or malfunctioning, the grant signal is not propagated farther, and therefore all the adapters located after the interruption cannot work until the bus continuity has been reestablished.

These two drawbacks have been partly overcome in U.S. Pat. No. 4,380,052, where a plurality of processing units are connected to a single daisy-chained bus assignment control line. This control line is a closed loop, hence giving each processing unit an equal chance to receive the grant signal allowing access to the transmission bus.

Besides, according to cited U.S. patent, each unit is provided with means permitting to detect when the preceding unit is malfunctioning or is turned off, and in response thereto, to regenerate the bus assignment control signal and transmit it to the next succeeding unit if it does not request access to the transmission bus. Thus the continuity of operation of the bus is preserved, provided that two or more adjacent units are not simultaneously failing. Since the means for detection of malfunctioning include a timer, each interruption in the control signal propagation implies a significant loss of time.

However, in case of failure of a unit, a malfunction circuit is activated.

The element failing to receive the pulse to be propagated re-initiates a similar pulse after one timer period, so that the system can continue to operate. Nevertheless, each interruption of the control signal propagation is added to the overall transmission time of said signal on the control line and therefore, it implies a significant loss of time, cutting down the performance of the transmission bus.

Furthermore, the delay introduced by each timer may be very difficult to predetermine, since it must be greater than the longest transmission time of each processing unit, said transmission time depending besides on the task being performed by each unit. Finally, during each transmission cycle of the bus, there will be as many timer durations wasted, as there are non-working adapters in the loop.

It is, then, an object of the present invention to provide a circuit for improving the operation of a plurality of adapters connected to a bus in a daisy-chain configuration, defining the same priority level for each adapter, and allowing one or several adapters to be unplugged or turned off without interruption of the operation of the transmission bus, and without decrease of its performance.

SUMMARY OF THE INVENTION

The present invention consists of a circuit for improving the operation of a plurality of adapters, each of which generates a status signal ("ADAPTER PRESENT"), said adapters being connected to a bus in a daisy-chain configuration transporting a regular grant signal "GR" transmitted by said adapters and which is trapped by any adapter in the chain provided that said adapter has a service request which is to be satisfied by a Central Control Unit connected to said adapters by a transmission bus, or which may be transmitted adhead as a "GRA" signal to the next adapter in the chain if no service request is to be satisfied. The circuit according to the invention comprises (FIG. 3):

adapter-selecting means which receive the service requests from the different adapters and prevent any adapter from raising a new service request as long the other adapters have requests pending, and in each adapter:

means for providing the grant signal transmitted by an adapter No (n−1) to be propagated on the chain directly to the adapter No (n) on the one hand, and to the adapter No (n+1) on the other hand, adapter No (n) being by-passed by the grant signal in the latter case, grant signal selecting means responsive to the status signal of an adapter No (n−1) for determining which grant signal among the "GR" and "GRA" signals has to be selected by adapter No (n), said adapter No (n) selecting the regular grant signal "GR" transmitted by adapter No (n−1) in case the status signal "ADAPTER PRESENT" of the latter adapter indicates that it is operative, and said adapter No (n) selecting the "GRA" signal generated by adapter No (n−2) and which by-passes adapter No (n−1), in case the status signal "ADAPTER PRESENT" of adapter No (n−1) indicates that it is not operative.

Furthermore, the circuit according to the invention is characterized in that the adapters are partitioned into groups, the status signals ("ADAPTER PRESENT")

and grant signals "GRANT"; "GRANT AHEAD") provided by each adapter of a group being respectively ORed on a common line and then provided in parallel to the different adapters of the next succeeding group in the chain, and the request status signal of each adapter being ORed onto a common request line, each adapter comprising (FIG. 5): means for generating, in case an adapter of said group is requesting access to the transmission bus, inhibition signals for disabling the other adapters of the group from propagating a grant signal towards a succeeding adapter in the group and further to the next group, when said grant signal has still to remain trapped in said requesting adapter of said group.

BRIEF DESCRIPTION OF THE DRAWINGS

FIG. 7 represents in greater detail the control circuitry associated to the adapters when they are partitioned as shown in FIG. 6.

DETAILED DESCRIPTION OF THE INVENTION

Figure 1:
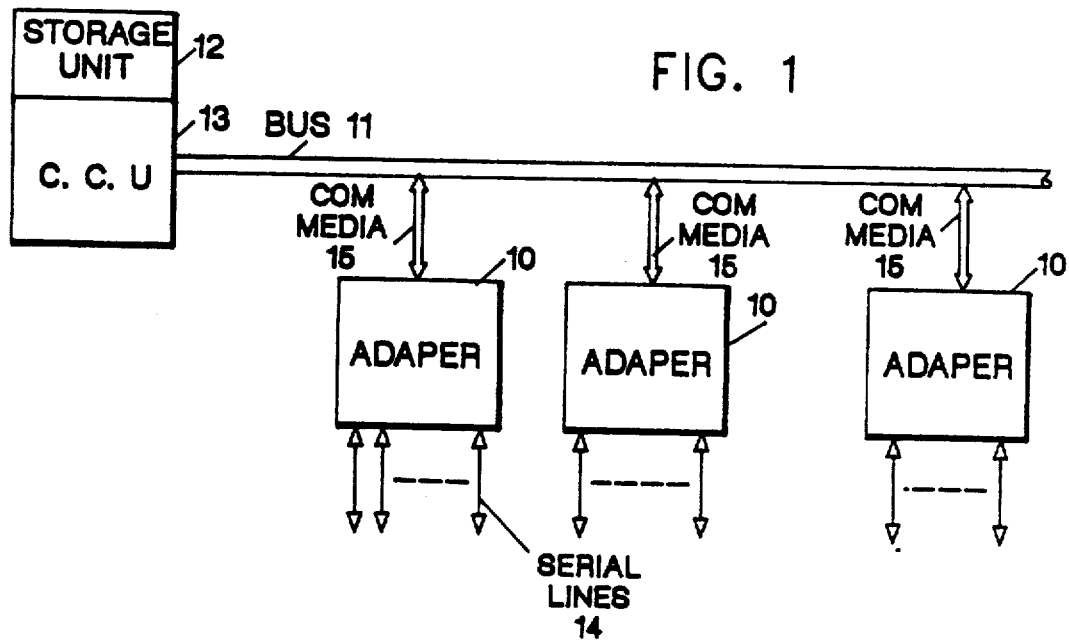
FIG. 1 represents partially the general arrangement of a communication controller in which the circuit according to the present invention may be incorporated.

As shown in FIG. 1, a plurality of adapters 10 are connected via communications media (COM MEDIA) 15 to a single transmission bus 11 allowing data exchanges with a storage unit 12, these data exchanges being controlled by a central control unit (CCU) 13.

Besides, each adapter is connected by serial lines 14 to a plurality of users' terminals (not shown).

Figure 2:
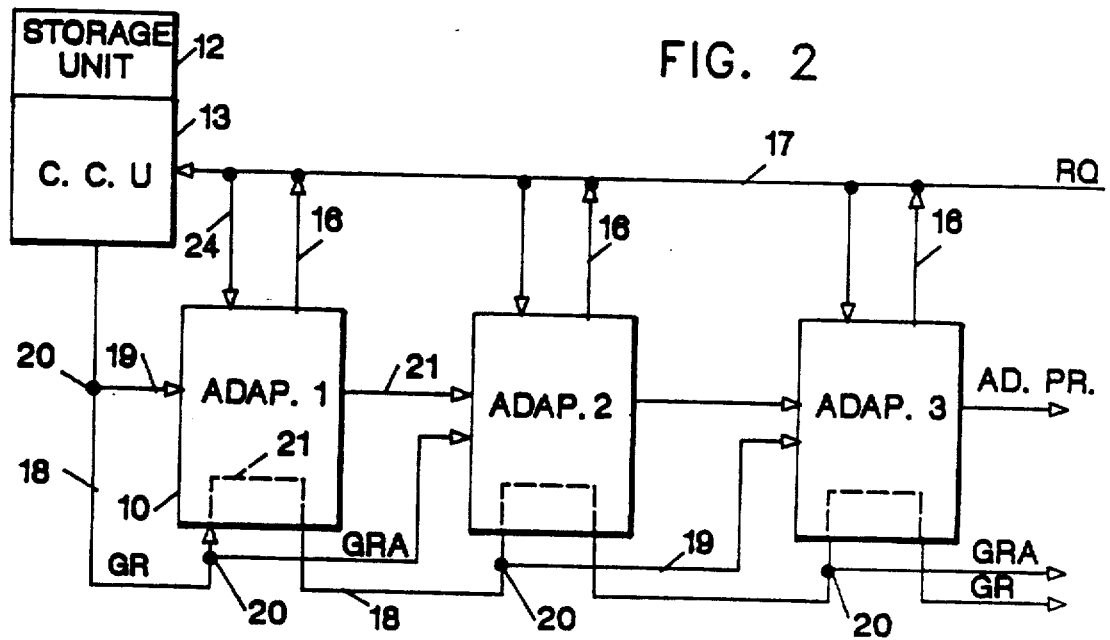
FIG. 2 represents schematically the paths of the control signals involved in the present invention.

As shown in FIG. 2, when several line-adapters are used in a communication controller, each of them being connected to several users' terminals (not shown), they might well ask for access to the transmission bus 11 (FIG. 1) simultaneously, or at least within a short period of time.

Therefore, a priority problem may occur, and has been solved in the following manner:

When a user request access to the bus 11, the corresponding line-adapter sets ON an internal request status which remains latched until the service of said adapter has been completed. For service to be granted to said adapter, the request status needs to be placed on the request dotted line 17 of the transmission bus 11. This is only possible when no other adapter has already placed a request on request line 17. Therefore, according to the invention, the request signal is only transmitted to the Central Control Unit 13 when no other requests are ON, that is when the request line 17 is OFF. When an adapter which monitors the request line 17 recognizes that it is OFF, it latches a "RQ.ON" signal on said request line 17 by way of wire 16. According to the invention, the latched "RQ.ON" signal is simply obtained by the use of a latch 22 and a driver 29 (FIG. 3), the output of which is ORed onto the request line 17 by dotted wires 16. Therefore, the request line 17 is a control line which may in fact be integrated into the transmission bus 11, and which is consequently connected to the Central Control Unit 13, for which it performs the selecting of the adapters according to their status.

Figure 3:
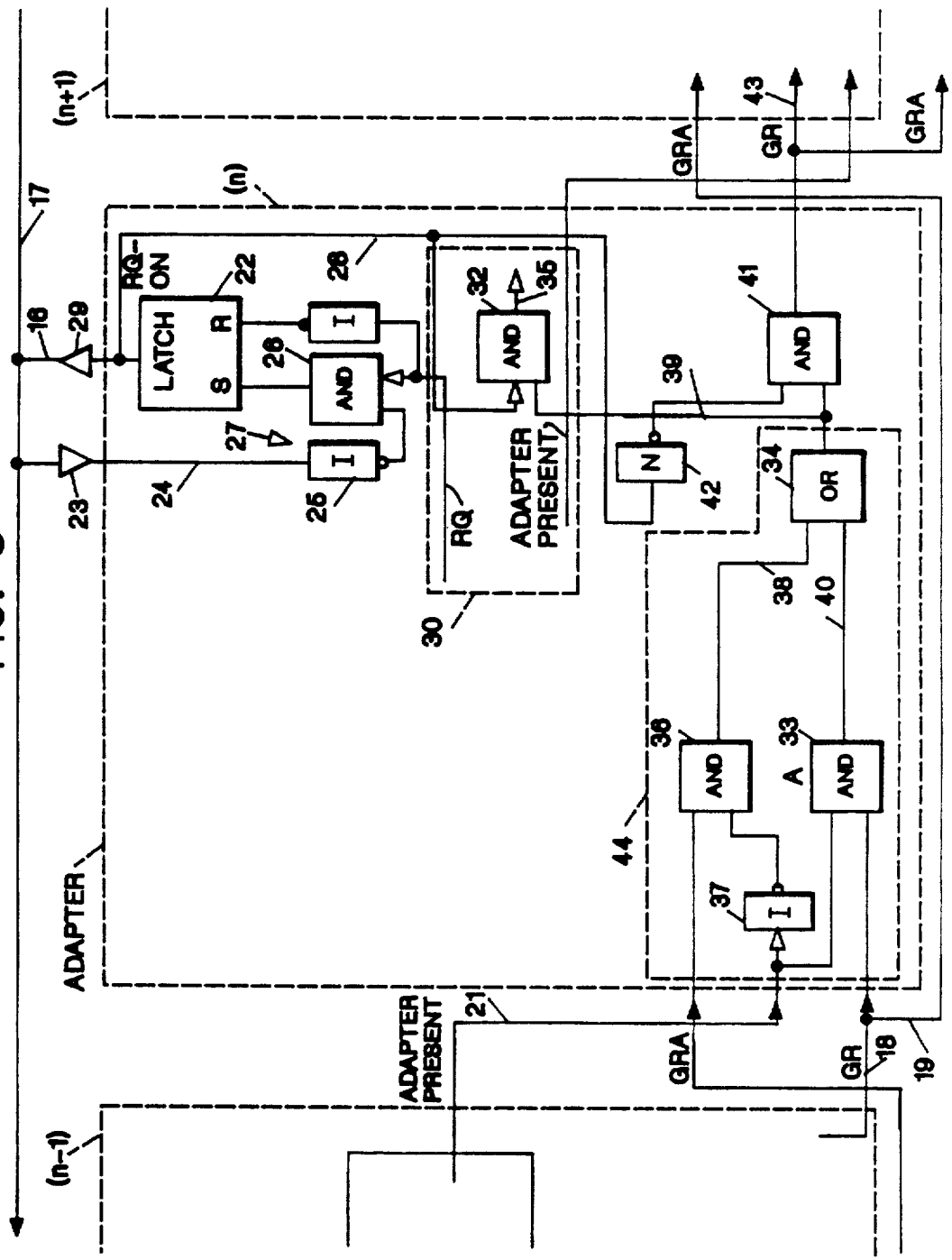
FIG. 3 represents in greater detail the control circuitry associated to each adapter, so that it may be connected, upon request, on the bus, provided that other adapters are not connected to it at the same time.

Thus, on a given moment, the "RQ.ON" signal being HIGH on the request line 17 means that the corresponding adapter is requesting access to the transmission bus, and that it succeeded in presenting its request to the Central Control Unit 13. Besides, each adapter monitors the service requests on the request line by way of adapter selecting means including logic means 27 and the request line 17 itself (FIG. 3). Those logic means are responsive to the request status of each adapter and present a request to line 17 only if said line is OFF, that is when no other adapter is requesting access to the transmission bus. The monitoring of the request dotted line 17 can be achieved by several simple circuits, one possible and very simple embodiment being shown in FIG. 3 where the request line status is inverted by inverter 25 and ANDed with the request status of each adapter by way of AND gate 26, the output of which is provided to the latch 22.

Thus, whatever its position in the chain, any adapter can be granted access to the bus, provided that it has its request status ON and that it has first put its "RQ.ON" signal onto the request line 17.

The Central Control Unit monitors the status of the request line 17, and, when it finds said status ON, it generates a grant signal, as known in the art. This grant signal is propagated on wire 18 (FIG. 2) and daisy-chained to the successive adapters. Thus the grant signal first reaches adapter No. 1, which is consequently allowed to exchange data with the transmission bus, provided that it has latched a transmission request on request line 17.

If not, that is in case the grant signal has been generated to satisfy a request originated from an adapter located farther in the chain, said grant signal is propagated to the next succeeding adapter in the chain, until it reaches the adapter which has latched a request onto line 17 in order to access bus 11. When the considered adapter stops exchanging data with the bus, its request status becomes OFF, and is latched onto request line 17. Accordingly, the C.C.U stops emitting the grant signal, unless a further request appears on the request line 17.

Besides, it appears that if either a card is unplugged or if an adapter located before the requesting one is powered off, or more generally inoperative, the daisy-chain is interrupted, since the adapters down along the bus cannot be reached by a grant signal, and therefore they are barred access to the transmission bus 11 and to the C.C.U 13.

This important drawback is solved by the following feature of the present invention, as explained hereafter.

The principle consists in having two daisy-chained grant inputs for each adapter, the first one being the regular daisy-chained input (GR in FIG. 2), and the second one being the grant input received by the adapter ahead on the chain (GRA in FIG. 2), propagated in parallel on wires 19, the regular grant signal being divided into two parts at each point 20.

Thus, according to FIG. 2, if adapter No. 2 is assumed to be turned off for any reason, a by-passing grant signal "GRA" is nevertheless immediately transmitted to adapter no 3. Consequently, if its request signal in ON and has been latched onto the request line 17, adapter no 3 may be given access to the transmission bus without loss of time.

Obviously, adapter no 3 must take account of the grant ahead signal it receives, only if adapter No 2 is turned off or missing, that is when it is not able to provide the regular grant singal to adapter No 3. If this were not the case, contention problems could appear between several adapters which would simultaneously request access to the transmission bus.

Therefore, each adapter provides a status signal "ADAPTER SIGNAL" which is, according to the invention, transmitted on a wire 21 to the succeeding adapter in the chain, said status signal being taken into account by a control logic located in each adapter as explained further (FIG. 3).

It is clear that said status signal can easily be generated by any convenient output pin of the adapters, provided that the ability of the adapters to access the bus in well reflected by said output pin.

It is now referred to FIG. 3, where the logic means mentioned above are represented. Each adapter connected to the chain comprises its own adapter-logic 30. This logic 30 generates the "ADAPTER PRESENT" signal for indicating that the corresponding adapter is operative, and a "REQUEST" signal for indicating that the considered adapter has a request pending for accessing the transmission bus. However, this logic 30 is not further described since it is known in the art and is not a part of the present invention.

The current adapter No (n) in the chain receives as inputs the following signals:

the status signal "ADAPTER PRESENT" sent from adapter no (n−1) to the current adapter No (n), indicating whether adapter No (n−1) is in working condition.
the bus access granting signal "GRANT" (abbreviation: GR) provided by adapter No (n−1) and indicating to adapter No (n) that adapter No (n−1) does not request access to the bus, so that a succeeding adapter may use it.
the by-pass signal "GRANT AHEAD" (abbreviation: GRA) sent by adapter No (n−2) to adapter No (n), in order to provide the latter with a grant signal, permitting the chain to remain uninterrupted in case adapter No (n−1) would fail.

Accordingly, the current adapter No (n) outputs the following signals:

its own "ADAPTER PRESENT" signal, sent to the corresponding input of adapter No (n+1).
its own "GRANT" signal, propagated to the corresponding input of adapter No (n+1) in case it is not itself in request status, said "GRANT" signal being further propagated in parallel to adapter No (n+2), for which it acts as the "GRANT AHEAD" signal, while adapter No (n+1) is by-passed.

As it appears in FIG. 3, the implementation of the specific control logic of each adapter is very simple. If it is assumed that positive logic is used, only a few basic gates with two inputs for each, are necessary per adapter, in order to obtain the previously described functions.

According to the invention, the circuit comprises adapter selecting means (17,27,26,25 as explained before), for determining which adapter is ready for a data exchange with transmission bus, and grant signal selecting means 44 for determining which grant signal ("GR" or "GRA") has to be considered by said adapter, said means 27 and 44 being described below.

The regular grant signal "GR" provided by adapter No (n−1) is supplied to AND gate 41 by way of AND gate 33 and entry 40 of OR gate 34. Besides, the "GRA" signal provided by adapter No (n−2) is supplied to AND gate 41 by way of AND gate 36 and entry 38 of OR gate 34.

Furthermore, since the "GRANT AHEAD" signal ("GRA") is to be taken account of by adapter No (n) only in case adapter No (n−1) is inactive, the "GRA" signal is gated through AND gate 36 together with the "ADAPTER PRESENT" signal, once the latter has been inverted by inverter 37.

If adapter No (n−1) is active, it is the regular grant signal "GR" which has to be taken into account by adapter No (n), and therefore the "GR" signal is gated through AND gate 33 together with the "ADAPTER PRESENT" signal. Consequently, the output of OR gate 34 will select "GR" or "GRA" depending on the "ADAPTER PRESENT" signal status.

According to whether or not the adapter No (n) has latched a "RQ.ON" signal on the request line 17, the grant signal transmitted by OR gate 34 has to be provided respectively to an AND gate 32 located within the logic 30 of adapter No (n), or to the next succeeding adapter No (n+1) via AND gate 41.

Therefore, the output of OR gate 34 is picked up by a wire 39, and ANDed by gate 32 with the latched "REQUEST ON" signal available, between the entry of a driver 29 and the output of latch 22, on a wire 28, and as a result, the output 35 of AND gate 32 may be used to trigger the logic 30 in order to fulfill the data exchanges between adapter No (n) and the transmission bus.

In order to avoid the grant signal being propagated towards the next succeeding adapter No (n+1) when adapter No (n) is still exchanging data with the transmission bus 11, the inverted "RQON" signal is provided to AND gate 41 by an inverter 42.

Thus, the grant signal can only be propagated farther once adapter No (n) has its "RQ.ON" signal LOW. Otherwise, said grant signal remains trapped in the control logic of adapter No (n) as previously described, until the end of the request period of said adapter. After the end of said request period, a new grant signal can be generated by the C.C.U., upon receipt of a new "RQ.ON" signal originated by another requesting adapter.

It is to be noticed that if "ADAPTER PRESENT" is low, the entry 38 of OR gate 34 will be high provided that the "GRA" signal is, and as a result, the entry of AND gate 35 connected to wire 39 will be high too.

As a result, it appears that according to the "ADAPTER PRESENT" status, "GR" or "GRA" is in any case selected and propagated towards OR gate 34, provided that there are never two successive adapters unplugged in the chain before adapter No (n).

If the latter assumption is realized, the output of OR gate 34 is high and is sent through AND gate 41, together with the "RQ.ON" signal, inverted by inverter 42. Thus, the output 43 of gate 41 generates the regular grant signal "GR" to be transmitted by adapter No (n) to the succeeding adapter No (n+1). The propagation scheme of the grant signal, as described before, permits the chain of adapters to remain operative when only a single adapter is unplugged between two active ones.

However, according to the invention, this propagation scheme can be generalized so that several successive adapters may be unplugged without general interruption in the operation of the chain. This feature will be easily understandable in reference to FIGS. 4 to 7.

Figure 4:
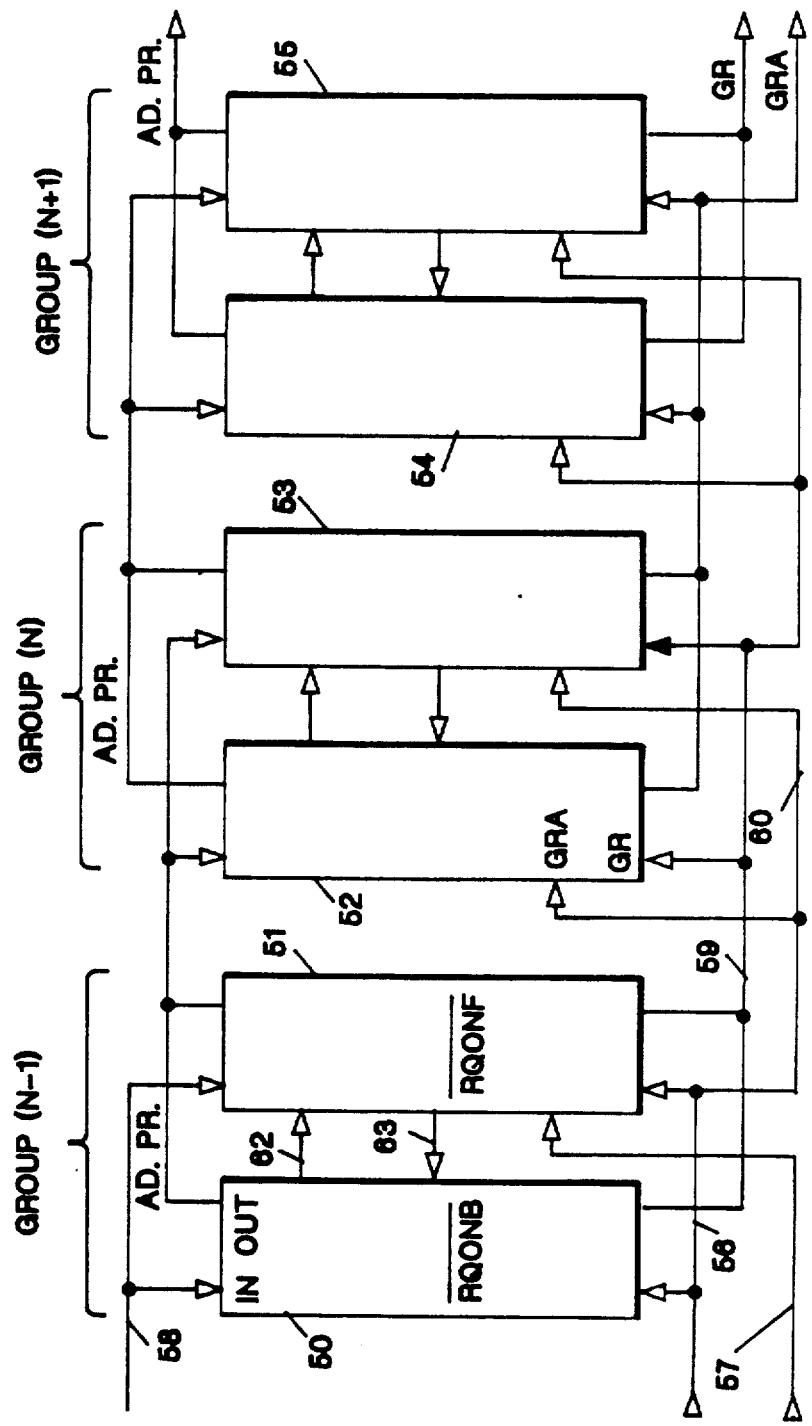
FIG. 4 represents another arrangement of the circuit according to the invention, the adapters being partitioned into groups of two.

FIG. 4 shows several adapters of the chain, said adapters 50 to 55 being partitioned into groups of two, thus forming succeeding groups numbered (N−1), (N), (N+1). The principles of interconnection between the adapters as described before are still the same, that means that each adapter receives "GR", "GRA", "ADAPTER PRESENT" signals and generates again such signals. But within a group or two adapters, the ingoing signals are distributed in parallel to each adapter (wires 56, 57 and 58), and the outgoing signals are dotted or provided through OR gates (wires 59, 60 and 61) towards the next succeeding groups. As a result, each group of two adapters reacts in the chain as a single adapter did in the basic scheme. But to obtain this result, each adapter within a group must "inform" the other of its request status, in order to avoid contention problems when accessing the transmission bus. This is achieved by two inhibition signals "REQUEST ON FORWARD" and "REQUEST ON BACKWARD" which are exchanged on wires 62 and 63 between the adapters of a group, as shown in FIG. 4, and further in FIG. 5. Accordingly, the following rules are respected in the propagation of the control signals along the chain:

a group of adapters generates the "GR" and "GRA" signals only when none of its adapters has a request pending to access the bus.

relatively to the "ADAPTER PRESENT" signal, a group of adapters is considered by the next succeeding group, as a single adapter. Accordingly, when at least one of the adapters of a group is present, the whole group is supposed to be active, that means that it has to provide the next two groups respectively with a "GR" and "GRA" signal as soon as there is no request pending within said first group.

Figure 5:
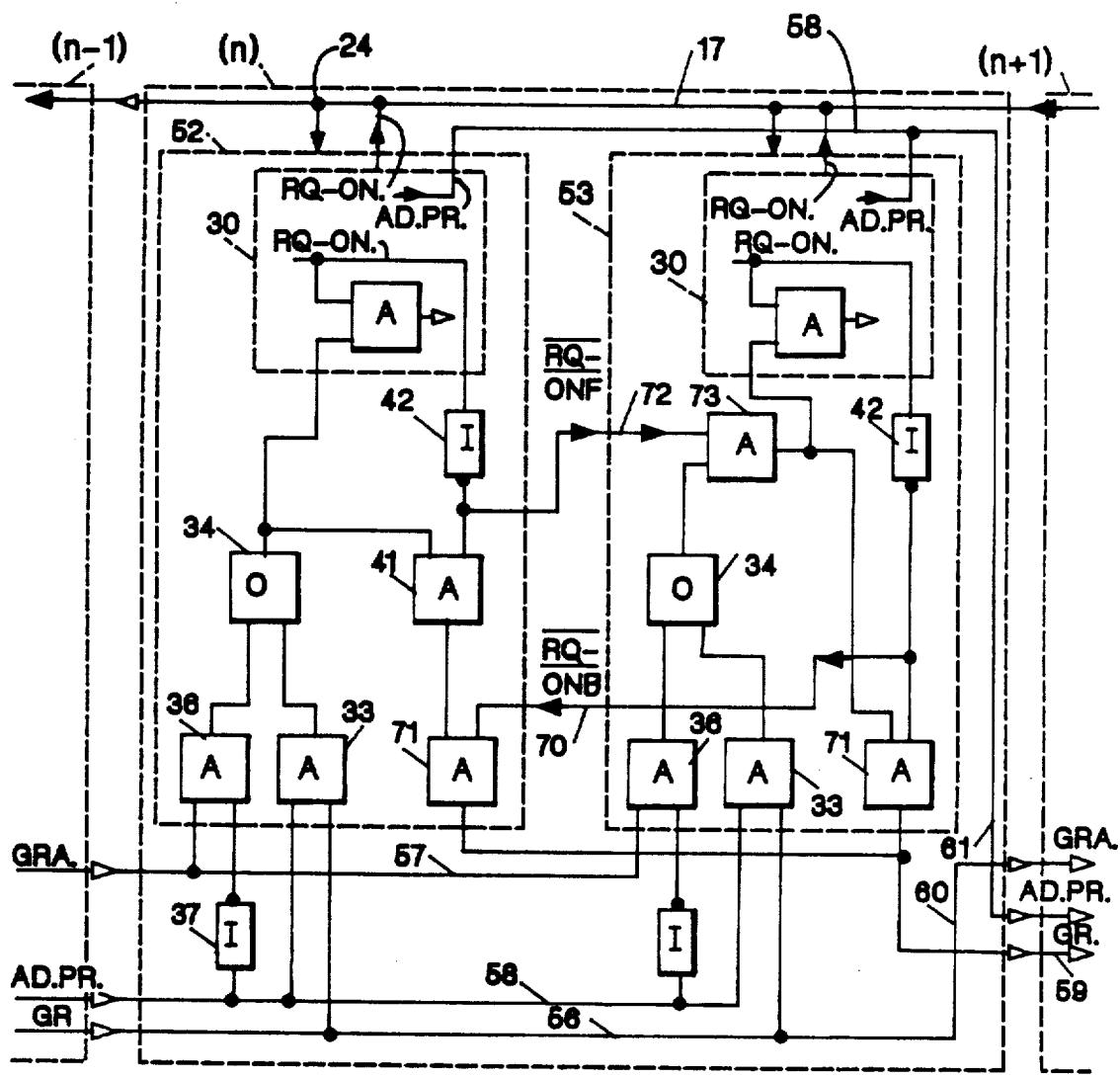
FIG. 5 represents in greater detail the control circuitry associated to each adapter, the adapters being partitioned as shown in FIG. 4.

FIG. 5 shows in greater detail a simple implementation of the external inhibition means enabling an adapter in a group of two to prevent the other one from propagating a grant signal towards the next succeeding group in the chain, as long as the first cited adapter is requesting access to the transmission bus. Additionally, FIG. 5 shows an implementation of the internal inhibition means preventing the grant signal from being internally propagated to the next adapter in the group when it is to be trapped in the adapter which is requesting access to the bus.

The control logic associated to each adapter 52 and 53 of group (N) is about the same as the one described in relation to FIG. 3, although the means enabling an adapter to monitor the request dotted line status have not been detailed in this figure. The input signals "GR", "GRA", "AD.PR." are here supplied in parallel to the adapters 52, 53, and the outgoing signals are ORed by wires 59, 61 as explained previously. Besides, the adapter 53 signals to adapter 52 if it has a request pending, and if so, it prevents adapter 52 from propagating a grant signal "GR" to the next group.

This is achieved by the "REQUEST ON BACKWARD" signal, which is in fact the inverted "RQ." signal latched onto the request line 17 by adapter 53, and which is supplied by a wire 70 to an additional AND gate 71. This gate is also provided with the normal grant signal transmitted by adapter 52 at the output of gate 41.

Furthermore, when adapter 52 is asking for access to the transmission bus ("RQ.ON" high), it inhibits the propagation of a grant signal to the next group until adapter 52 is no longer in request status. This is achieved by the "REQUEST ON FORWARD" signal, which is in fact the inverted "RQ.ON" signal of adapter 52, and which is supplied on a wire 72 to an additional AND gate 73. This gate is also provided with the normal grant signal transmitted by adapter 53 at the output of its OR gate 34.

As a result of the partitioning of the adapters into groups of two, it occurs that a group No (N) is unable to generate a regular grant signal unless the two adapters it contains are both unplugged or turned off. In this case, the chain remains nevertheless operative, since the group No (N−1) will propagate a "GRA" signal directly ahead towards the adapters of group No (N+1).

Finally, it appears that when the adapters along the chain are partitioned into groups of two, a maximum of four successive adapters can simultaneously be unplugged without interruption of the operation of the chain, provided that said inactive adapters are shared by three successive groups.

It also appears that in case it would be interesting to allow to a greater number of successive adapters to remain unplugged without disrupting the chain, it would be sufficient to link a plurality of successive adapters together in an adequate manner, so that they form bigger groups. Thus, according to the invention, the implementations described until now may be further generalized, as shown if FIGS. 6 and 7, although the length of the groups and of the chain may be limited for technological reasons, or for reasons related to the users' needs (powering requirements for the groups of adapters, importance of the external wiring . . . ), and therefore, the length of the groups will be the object of compromises between performance and reliability.

Figure 6:
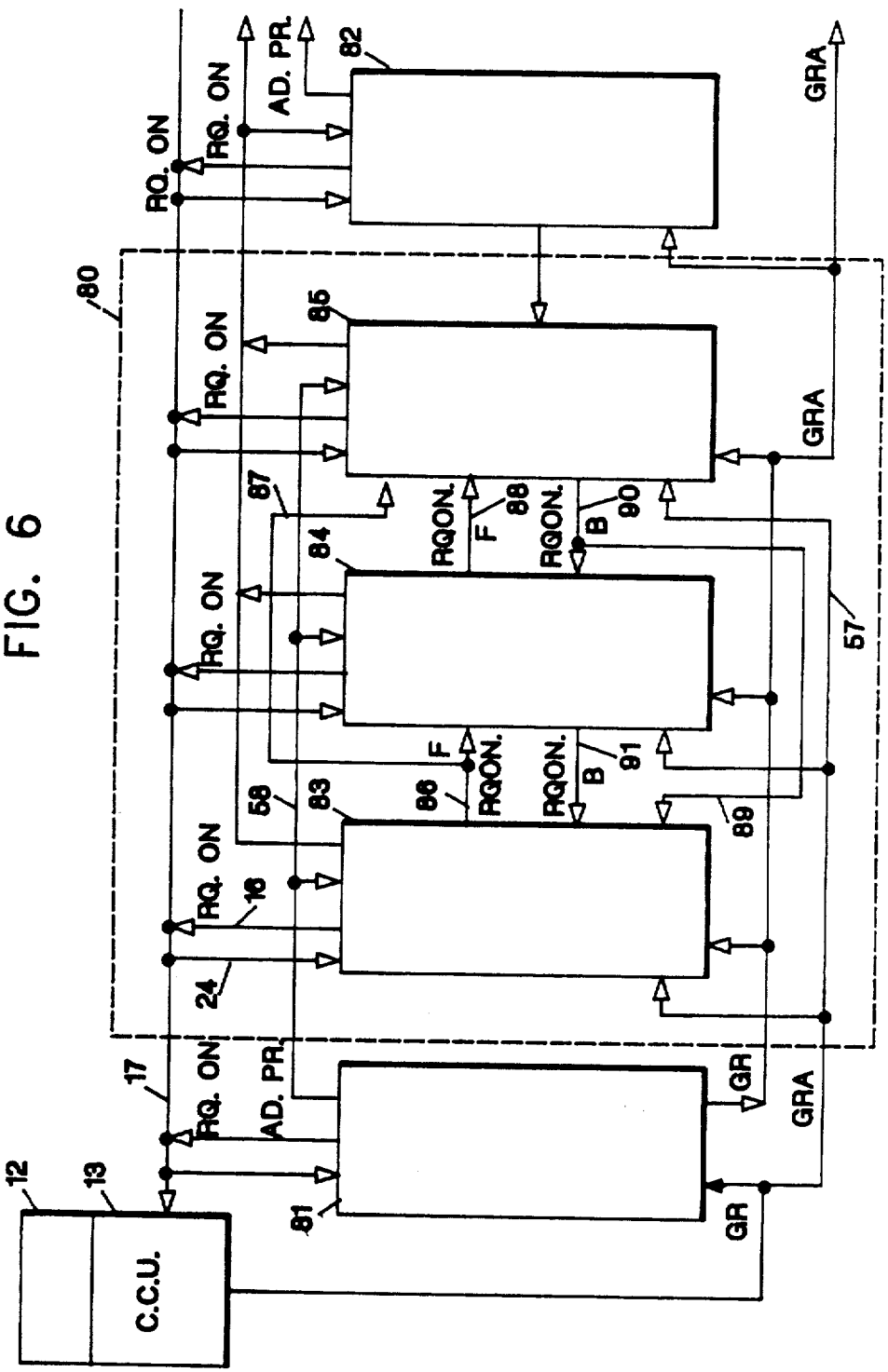
FIG. 6 represents a further arrangement of the circuit according to the invention, some adapters being partitioned into a group of three.

In FIG. 6, a group 80 of three interconnected adapters is shown, but this limited number is only an example which is not intended to restrict the generality of the invention. Furthermore, the group 80 is located between adapters 81 and 82, which could also be replaced by other groups of any number of adapters.

As before, the in-going signals "GR", "GRA", "ADAPTER PRESENT" are supplied in parallel to the adapters 83 to 85, while the outgoing signals "GR", "GRA", "ADAPTER PRESENT" are supplied (not shown) to the succeeding adapters or groups in a dotted form, which operates, relatively to the logic, like OR gates. Besides, each single adapter brings its RQ.ON signal onto the common request dotted line 17. Within group 80, the adapters are inter-connected by control lines (86 to 91). On these lines circulate the internal and external inhibiting means: the "REQUEST ON FORWARD" and "REQUEST ON BACKWARD" signals, as more detailed in FIG. 7. The aim of the "REQUEST ON FORWARD" signals circulating on lines 86, 87, 88 is, for any adapter, to inform all the adapters situated ahead of it in the group 80, whether the considered adapter wants to access the transmission bus, and therefore wants to disable the adapters situated ahead, from receiving a grant signal.

Similarly, the purpose of the "REQU282 signals circulating on lines 89, 90, 91 is, for any adapter, to inform all the adapters located before it in the group 80, whether the considered adapter wants to accede to the bus, and therefore wants to disable the adapters situated before, from propagating the grant signal towards the exterior of group 80 and towards the next group.

In the last figure, an implementation is shown in which each adapter 83, 84, 85, of the group 80 is supplied with a "GR" or "GRA" signal by the logic circuitry referenced 44, shown in greater detail in FIG. 3 under the same reference 44. If an adapter of the group 80 receives a "GR" or "GRA" signal while its request status is high, it will normally be granted access to the bus. While data are being exchanged with other devices connected to the bus, no other adapter, either in the same group or not, must obtain a grant signal. Therefore, external and internal inhibition means are necessary in order to prevent any grant signal to be propagated within group 80 or towards a succeeding group, as long as an adapter of group 80 is communicating with the bus. Such inhibition means are provided in a very symmetrical way by the "REQUEST ON FORWARD" and "REQUEST ON BACKWARD" signals generated and propagated as shown in FIG. 7. The control logic necessary for this purpose is very limited, although it would become slightly more complex if more than three adapters were to be connected within a group 80.

In the case of the first adapter 83 of group 80, the "GR" or "GRA" signal provided by the logic circuitry 44 is sent through AND gate 41 together with the "RQ.ON" signal of adapter 83, once inverted by inverter 42, and the output 101 of gate 41 is further ANDed (gate 93) with a "RQ.ON.B" signal provided by adapter 84 on line 91. The output of AND gate 93 is supplied to AND gate 71, together with a "RQ.ON.B" signal provided by adapter 85 on line 89. The AND gate 71 is intended to transmit the grant signal to the next succeeding group (not shown) on line 105.

Thus, the output signal of gate 71 cannot be high as long as adapter 83 has its request status high. Consequently, the output of a grant signal by adapter 83 toward the exterior of group 80 is inhibited as long as the inverted "RQ.ON" signal provided to AND gate 41 of adapter 83 is LOW.

Furthermore, the internal inhibition signal "RQ.ON.F." which is propagated from adapter 83 towards the succeeding adapters 84, 85 of group 80, prevents the "GR" or "GRA" signal emitted by gate 34 (FIG. 3) of being taken account of by the gates 32 of said succeeding adapters, as long as the request signal "RQ.ON" of adapter 83 is high.

This is achieved by supplying entry 102 of AND gate 32 with the output of AND gate 73 receiving itself as entries: the grant signal delivered by the logic means 44, and the inverted "RQ.ON.F" signal picked up at the output of inverter 42. In the case of the first adapter 83 in a group 80, the "REQUEST ON FORWARD" signal is generated by using the inverted "RQ.ON" signal of said first adapter 83, but the same principle applies to the other adapters 84 and 85 of group 80.

The external inhibition signal "RQ.ON.B" is similarly generated at the output of inverter 42 of each adapter and transmitted on lines 89, 90, 91 to the adapters situated backwards in the group 80. Therefore, each "RQ.ON.B" signal prevents the grant signal which may be present on one of the lines 106, 107, 108 from being transmitted on the common grant line 105 and output towards the next group when it is still to remain trapped in group 80.

Naturally, as soon as all the adapters of group 80 have their request status low, the external and internal inhibition means as described before, become inactive, so that the grant signal can be propagated from adapter to adapter, and towards the next group along the daisy-chain.

As a result of the structure of the circuit, when the adapters are connected in accordance with the generalized form of the invention, a whole group of adapters may remain unplugged, without disrupting the operation of the chain, and without loss of time in the propagation of the grant signal.

In this case, the regular grant signal "GR" is transmitted as a grant-ahead signal "GRA", which by-pases the whole unplugged group and goes to the next succeeding adapter or group of adapters.

It may also be noticed that since the "GR" and "GRA" signals are provided in parallel to the adapters of a group by the logic circuitry 44, they reach their destination even when an adapter of the group is failing. In this case the "RQ.ON.F" and "RQ.ON.B" signals would nevertheless be properly propagated, since they would by-pass the failing adapter by lines 87, 89, and accordingly the rest of the chain would be operative, as a group 80 would, even if an adapter would fail in said group.

Naturally, if the groups 80 should include more than three adapters, more wiring would be needed between the adapters of a group in order to enable the "RQ.ON.B" and "RQ.ON.F" signals to by-pass a failing adapter, but the overall reliability of the group might accordingly be affected.

Another solution would consist in stopping the whole group when one of its elements is unplugged, and the remaining adapters of the chain would operate normally. In this last case, it would be very economical to provide all the adapters of a group with a common powering unit.

In a still different embodiment of the invention, an adaptor could even generate several "GRA" signals, which would by-pass more than one adapter in order to reach several succeeding adapters. This method could be used alone, or combined with the previously described implementation, in which several adapters are connected into groups. This last method would be less attractive because considerable wiring would be necessary to propagate a "GRA" and request status signals towards several adapters.

In any case, depending on the number of adapters to be connected in the daisy-chain, and on the specific requirements of operation of the bus, many compromises using the described embodiments are possible within the scope of the invention.

While this invention has been particularly shown and described with reference to the preferred embodiment thereof, it will be understood that various changes in form and details may be made therein without departing from the spirit and scope of the invention.

We claim:

1. A circuit for improving the operation of a plurality of adapters, each of which generates a status signal ("ADAPTER PRESENT"), said adapters being connected to a GR bus in a daisy-chain configuration said bus transporting a regular grant signal "GR" which is generated by a Central Control unit and is retransmitted by said adapters and said "GR" signal may be trapped by any adapter in the chain provided that said adapter has generated a service request which is to be satisfied by the Central Control Unit (13) connected to said adapters by a transmission bus (11) including a request line 17, or said grant signal "GR" may be retransmitted ahead as a grant ahead "GRA" signal to the adapter after a next adapter in the chain said circuit comprising:

- adapter-selecting means coupled to the request line, said adapter selecting means positioned in each adapter for monitoring service requests generated by other adapters (10) and generating a control signal that prevents any adapter from raising a new service request as long as the other adapters have requests pending;
- means (18, 19) for providing the grant signal "GR" and the grant ahead "GRA" signal, said "GR" signal being transmitted by an adapter No (n−1) and is propagated on the chain directly to the adapter No (n), and the "GRA" signal is being transmitted to the adapter No (n) from an adapter No (n−2) and by-passing said adapter No (n−1); and
- grant signal selecting means (44) coupled to the adapter selecting means, said grant signal selecting means responsive to the status signal "ADAPTER PRESENT" from an adapter No (n−1) for determining which signal among the "GR" and "GRA" signals has to be selected by adapter No (n), said adapter No (n) selecting the regular grant signal "GR" transmitted by adapter No (n−1) in case said status signal of the latter adapter indicates that it is operative, and said adapter No (n) selecting the "GRA" signal generated by adapter No (n−2) and which by-passes adapter No (n−1) in case said status signal "ADAPTER PRESENT" of adapter No (n−1) indicates that it is not operative.

2. Circuit according to claim 1 wherein the adapter selecting means comprise:
- a common request line (17) connected to the Central Control Unit (13) and to the adapters (10) for transmitting a request signal of said adapters (10) to said Central Control Unit (13);
- logic means (27) responsive to the request status of each adapter, for latching a service request raised by said adapters onto said request line (17) when its electrical state is LOW, said logic means (27) comprising inverter (25), AND gate 26, and latch (22) for monitoring the electrical state of said request line (17).

3. Circuit according to claims 1 or 2, wherein said means for providing the grant signal transmitted by an adapter No (n−1) and to be propagated to adapters No (n) and (n+1) comprise a first wire (18) providing the regular grant signal "GR" to adapter No (n), and a second wire (19) linked in parallel to the said first wire (18) at a point (20), where the "GR" signal is split into a grant ("GR") and grant ahead ("GRA") signals, the latter being provided to adapter No (n+1) by said second wire (19).

4. Circuit according to claims 1 or 2, wherein said status signal "ADAPTER PRESENT" of each adapter is generated by any pin signalling whether said adapter is able to access the bus, said status signal being provided as a control signal to the next succeeding adapter in the chain.

5. Circuit according to claims 1 or 2, wherein said grant signal selecting means of adapter No (n) comprise a logic circuitry (44) receiving the status signal "ADAPTER PRESENT", the regular grant signal "GR" generated by adapter No (n−1), and the by-passed grant signal "GRA" generated by adapter No (n−2), said logic circuitry (44) comprising an inverter (37) receiving the status signal "ADAPTER PRESENT", a first AND gate (36) receiving the "GRA" signal and inverted said status signal, a second AND gate (33) receiving the "GR" signal and said status signal, and an OR gate (34) receiving the outputs of said first and second AND gates (33) and (36).

6. A circuit for improving the operation of a plurality of adapters, each of which generates a status signal ("ADAPTER PRESENT"), said adapters being connected to a GR bus in a daisy-chain configuration said bus transporting a regular grant signal "GR" which is generated by a Central Control unit and is retransmitted by said adapters and said "GR" signal may be trapped by any adapter in the chain provided that said adapter has generated a service request which is to be satisfied by the Central Control Unit (13) connected to said adapters by a transmission bus (11) including a request line 17, or said grant signal "GR" may be retransmitted ahead as a grant ahead "GRA" signal to the adapter after a next adapter in the chain said circuit comprising:

- adapter-selecting means coupled to the request line, said adapter selecting means positioned in each adapter for monitoring service requests generated by other adapters (10) and generating a control signal that prevents any adapter from raising a new service request as long as the other adapters have requests pending;
- means (18, 19) for providing the grant signal "GR" and the grant ahead "GRA" signal, said "GR" signal being transmitted by an adapter No (n−1) and is propagated on the chain directly to the adapter No (n), and the "GRA" signal is being transmitted to the adapter No (n) from an adapter No (n−2) and by-passing said adapter No (n−1); and
- grant signal selecting means (44) coupled to the adapter selecting means, said grant signal selecting means responsive to the status signal "ADAPTER PRESENT" from an adapter No (n−1) for determining which signal among the "GR" and "GRA" signals has to be selected by adapter No (n), said adapter No (n) selecting the regular grant signal "GR" transmitted by adapter No (n−1) in case said status signal of the latter adapter indicates that it is operative, and said adapter No (n) selecting the "GRA" signal generated by adapter No (n−2) and which by-passes adapter No (n−1) in case said status signal "ADAPTER PRESENT" of adapter No (n−1) indicates that it is not operative, wherein said adapters are partitioned into groups (80), the status signal (ADAPTER PRESENT) and grant signals (GRANT, GRANT AHEAD) provided by each adapter of a group being respectively ORed on a common line (58, 56, 57) and then provided in parallel to the different adapters of the next succeeding group in the chain, and the request status signal of each adapter being ORed onto the common request line (17); and
- means for generating, in case an adapter of said group (80) is requesting access to the transmission bus, inhibition signals for disabling the other adapters of the group from propagating a grant signal towards a succeeding adapter in the group and further to the next group, when said grant signal has still to remain trapped in said requesting adapter of said group.

7. Circuit according to claim 6, wherein said inhibition signals consist of an internal inhibition signal ("REQUEST ON FORWARD") and an external inhibition signal ("REQUEST ON BACKWARD") which are exchanged between the adapters of a group, the internal inhibition signal preventing the grant signal from being internally propagated to the next adapter in the group when it is to be trapped in the adapter which is requesting access to the bus, and the external inhibition signal preventing the grant signal from being put out from the group and externally propagated to the next succeeding group in the chain, as long as it has to remain trapped in a determined adapter and a determined group.

8. An improved computer system comprising:
a storage;
a communications control unit coupled to said storage;
a plurality of adapters for receiving data from a plurality of user terminals and forwarding said data to the storage;
a bus including a request line interconnecting the adapters to said communications control unit;
a communications media interconnecting the adapters in a daisy-chained configuration to said communication control unit;
a first means provided in each adapter for generating and transmitting on said request line a service request signal if an adapter request accesses to the bus;
a second means provided in each adapter, said second means monitoring the request line and generating a control signal that prevents any adapter from raising a new service request signal if any of the adapters have a service request pending;
a third means provided in the communication control unit for generating and transmitting on said communications media a grant (GR) signal;
a fourth means coupled to the communications media, said forth means splitting the communications media into parallel paths so that the GR signal and a grant ahead (GRA) signal are propagated along the parallel paths, with the GR signal being transmitted by an adapter No $(n-1)$ and is propagated on one of said parallel paths to adapter No $(n)$, and GRA signal is being transmitted on another of the parallel paths to adapter No $(n+1)$; and
grant signal select means coupled to the second means, said grant signal select means responsive to a status signal "ADAPTER PRESENT" generated from an adapter No $(n-1)$ for determining which signal among the GR and GRA signals has to be selected by adapter No $(n)$, said adapter No $(n)$ selecting the regular grant signal GR transmitted by adapter No $(n-1)$ in case said status signal indicates that the adapter No $(n-1)$ is operative and said adapter No $(n)$ selecting the GRA signal generated by adapter No $(n-2)$ if said status signal "ADAPTER PRESENT" from adapter No $(n-1)$ indicates that it is inoperative.

* * * * *